United States Patent [19]
Kitagawa

[11] Patent Number: 5,243,127
[45] Date of Patent: Sep. 7, 1993

[54] NOISE ABSORBER

[75] Inventor: Hiroji Kitagawa, Nagoya, Japan

[73] Assignee: Kitagawa Industries Co., Ltd., Japan

[21] Appl. No.: 781,092

[22] Filed: Oct. 22, 1991

[30] Foreign Application Priority Data

Nov. 24, 1990 [JP] Japan .................. 2-319567

[51] Int. Cl.⁵ .................. H05K 9/00; H01R 4/00
[52] U.S. Cl. .................. 174/35 R; 174/35 C;
174/91; 336/92
[58] Field of Search .............. 174/35 R, 35 MS, 35 C,
174/35 TS, 72 A, 72 C, 91, 92, 93; 361/424;
336/90, 92, 175

[56] References Cited

U.S. PATENT DOCUMENTS

| | | | |
|---|---|---|---|
| 3,798,349 | 3/1974 | Thompson et al. | 174/92 |
| 4,029,896 | 6/1977 | Skinner | 174/92 |
| 4,049,357 | 9/1977 | Hamisch, Jr. | 403/209 |
| 4,453,798 | 6/1984 | Asick et al. | 339/143 R |
| 4,972,167 | 11/1990 | Fujioka | 336/92 |
| 5,003,278 | 3/1991 | May | 336/92 |
| 5,057,650 | 10/1991 | Urushibata et al. | 174/88 R |

FOREIGN PATENT DOCUMENTS

| | | |
|---|---|---|
| 0257179 | 8/1986 | European Pat. Off. |
| 60-144295 | 9/1985 | Japan . |
| 2205199 | 4/1988 | United Kingdom . |
| 2207007 | 7/1988 | United Kingdom . |
| 2223625 | 9/1989 | United Kingdom . |
| 2223886 | 9/1989 | United Kingdom . |
| 2223887 | 9/1989 | United Kingdom . |
| 2224394 | 9/1989 | United Kingdom . |
| 2230148 | 2/1990 | United Kingdom . |

Primary Examiner—Leo P. Picard
Assistant Examiner—Bot L. Ledynh
Attorney, Agent, or Firm—Davis, Bujold & Streck

[57] ABSTRACT

The noise absorber for an electrical wire of electronic equipment having a pair of mating members, at least a portion of which is molded of magnetic resin. The wire of electronic equipment, when positioned between the pair of mating members, is completely surrounded by the members molded of magnetic resin, so that magnetic flux is not excluded. Therefore, any noise generated within the wire is absorbed by the noise absorber.

6 Claims, 6 Drawing Sheets

5,243,127

NOISE ABSORBER

BACKGROUND OF THE INVENTION

This invention relates to a noise absorber which can be attached to and detached from an electrical wire of electronic equipment.

Conventionally, a noise absorber is molded of ferrite, and is typically shaped rectangularly or cylindrically such as a board or a pipe. Ferrite is a rigid, but brittle material so as to be preferably used for a simple-shaped member such as a board or a pipe. However, since the engaging portions of such a simple-shaped member are also molded of ferrite, when engaged mutually with resiliency a few times, damage of the engaging members result. Therefore, a conventional noise absorber for a wire comprises two coupling devices for surrounding a wire and a case for containing the coupling devices. The coupling devices are molded of ferrite and have abutment surfaces thereon. The coupling devices are contained in a case molded of a resilient material. The case is openable by a hinge, and engaging members are attached to the case integrally at the opposite side of the hinge. In another case, the case can be engaged only by the engaging members.

However, the above mentioned coupling devices for a noise absorber are molded of ferrite, and the case for containing the coupling devices are molded of a different kind of material from the coupling devices. Therefore, two kinds of material are necessary to manufacture the coupling devices and the case, respectively. Further, since it is preferable to achieve precise fitting of the coupling devices and the cases, precision in the manufacturing process is also needed. As a result, both material and manufacturing cost increase, and result in high cost of producing a noise absorber.

SUMMARY OF THE PRESENT INVENTION

It is an object of the present invention to provide a noise absorber molded of magnetic resin having resiliency and magnetism which absorbs noise effectively and can be attached to and detached from a wire easily and quickly.

To solve the above mentioned problems, the noise absorber of this invention can be attached to and detached from a wire for electronic equipment, and at least a part of the composing member thereof is molded of magnetic resin and shaped to surround the wire. Since the wire is completely surrounded by members molded of magnetic resin, magnetic flux is not excluded. Therefore, any noise generated within the wire is absorbed.

BRIEF DESCRIPTION OF THE DRAWINGS

The present invention will be described in detail with reference to the following drawings.

DETAIL DESCRIPTION OF THE PREFERRED EMBODIMENTS

Hereinafter, the embodiments of the present invention will be explained with the reference to the drawings.

Figure 1:
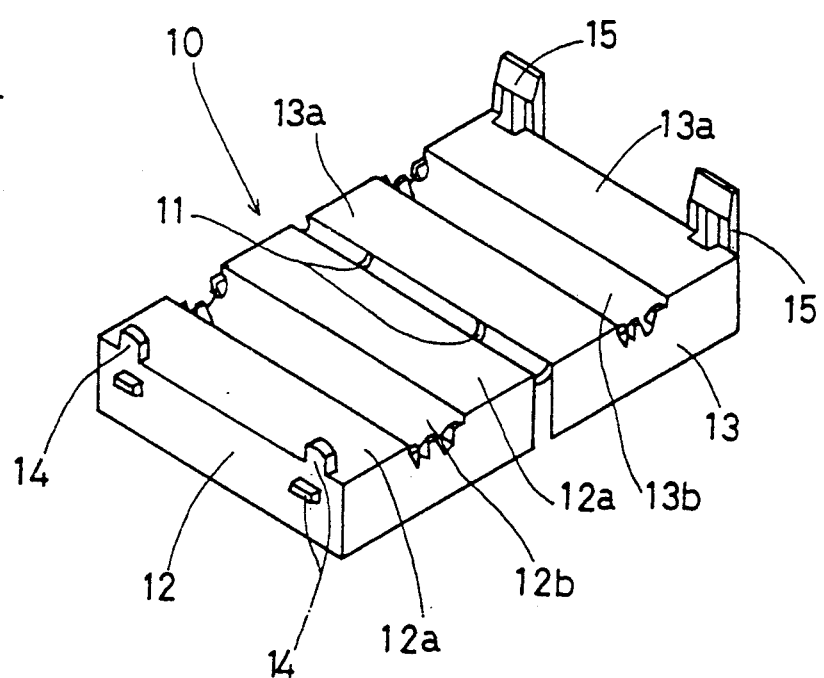
FIG. 1 shows a perspective view of a noise absorber of the first embodiment of this invention.

FIG. 1 shows a noise absorber 10 of the first embodiment. The noise absorber 10 is molded of magnetic resin which is compressed by mixing a sufficient amount of a powdered magnetic material, such as iron oxide and the like, and a powdered resin.

When plastic magnet is used as the composition of the powdered magnetic material and the powdered resin, 90% by weight or more ferrite powder as the powdered magnetic material is mixed in nylon as the powdered resin.

When the composition requires no flexibility, almost the same percentage of soft ferrite powder as that with the plastic magnet can be mixed in a rigid resin.

As the composition requiring flexibility, Japanese Published Unexamined Utility8 Model Application No. S60-144295 describes the flexible material of 10 to 20% by weight of soft magnetic powder such as Ni-Zn ferrite mixed with 90 to 80% by weight of synthetic resin, in which the noise in the band of 100 MHz or more is effectively absorbed.

The data of plastic ferrite prepared Mitsubishi Denki Kabushiki Kaisha and published in the magazine named EMC on Oct. 5, 1990 describes that the magnetic permeability is 800 $\mu$, when the powder of the sintered body of the soft ferrite such as Ni-Zn ferrite high is mixed in resin. When plastic ferrite is used, however, the magnetic permeability decreases to 50 to 70 $\mu$, because the resin is inserted as the binder among ferrite powder. According to the formula $\mu \times \text{frequency}(f) = \text{constant}$, when $\mu$ decreases, high frequency can be used. Therefore, the plastic ferrite, which has only small $\mu$, somewhat effectively absorbs the noise having the high frequency in the range of several 100 MHz.

The noise absorber 10 comprises an upper (first) case 12 and a lower (second) case 13, and can be opened and closed by a hinge 11. The configuration of the upper case 12 and the lower case 13 is right hexagonal. Abutment surfaces 12a and 12a are formed on the upper case 12, and a substantially semicircular channel 12b is formed therebetween for receiving a wire (not-shown). Engaging projections 14 project from one side edge of the upper case 12. Abutment surfaces 13a and 13a are formed in the same plane on the lower case 13, and a substantially semicircular channel 13b is formed therebetween for receiving a wire (not-shown). In addition, the engaging portions 15 projecting from one side edge of the lower case 13 can connect with and disconnect from the engaging projections 14.

When the upper case 12 and the lower case 13 are engaged by rotation about the hinge 11, the engaging projections 14 of the upper case engage with the engaging portions 15 of the lower case. Since the engaging projections 14 and the engaging portions 15 are molded of magnetic resin and have elasticity, each member engages with elastic deformation. After engagement, each engaging member regains its original shape and this strengthens the engagement. Thereby, the abutment surfaces 12a of the upper case intimately engage the abutment surfaces 13a of the lower case, and the channel 12a intimately engages the channel 13a so as to form a substantially circular through hole for a wire.

As mentioned above, when the upper case 12 is closed, the abutment surfaces 12a of the upper case 12 intimately engage the abutment surfaces 13a of the lower case 13. Therefore, magnetic line of force generated within the wire, inserted into the through hole, is not excluded, and noise is absorbed.

Figure 2:
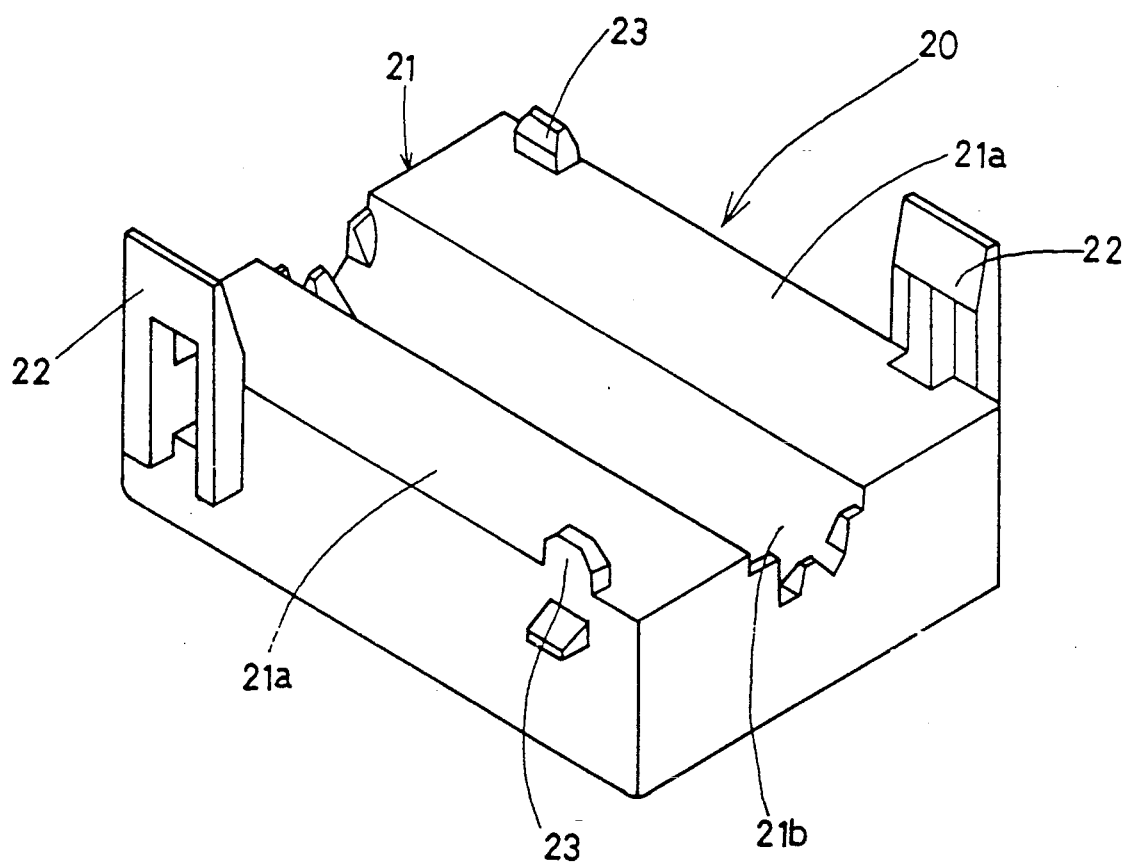
FIG. 2 shows a lower case of a noise absorber of the second embodiment.

FIG. 2 shows only a lower case 21 of a noise absorber 20 of the second embodiment. The depiction and explanation of the upper case is omitted, because the structure of the upper case is symmetrical with that of the lower case 21. The lower case 21 is molded of magnetic resin. On the lower case 21, the abutment surfaces 21a and 21a are formed in the same plane, and a substantially semicircular channel 21b is formed therebetween for receiving a wire (not-shown). In addition, on the lower case 21, engaging portion 22 and engaging projections 23 are formed on both sides of channel 21b in a diagonal position. The engaging portion 22 and the engaging projections 23 are integrally molded of the same material as that of the lower case 21. By attaching the upper case (not shown) to the lower case 21, both the engaging portions and the engaging projections resiliently engage and can be connected to and disconnected from each other. Both the semicircular channels intimately engage each other so as to form a through hole for a wire. Both abutment surfaces also intimately engage each other. Therefore, a magnetic line of force generated within the wire is not excluded by the abutment surfaces, and noise is absorbed.

Figure 3:
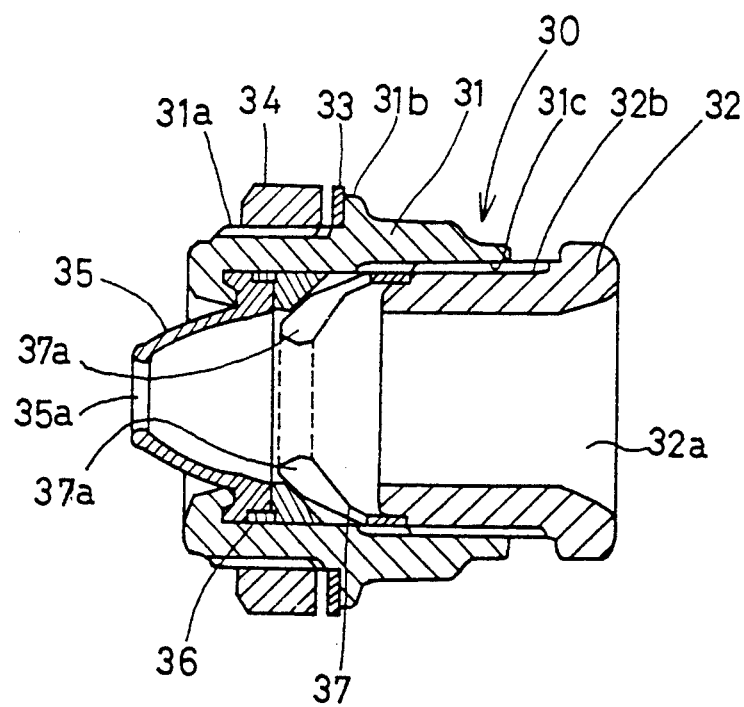
FIG. 3 shows a cross-sectional front view of a noise absorber of the third embodiment.
Figure 4:
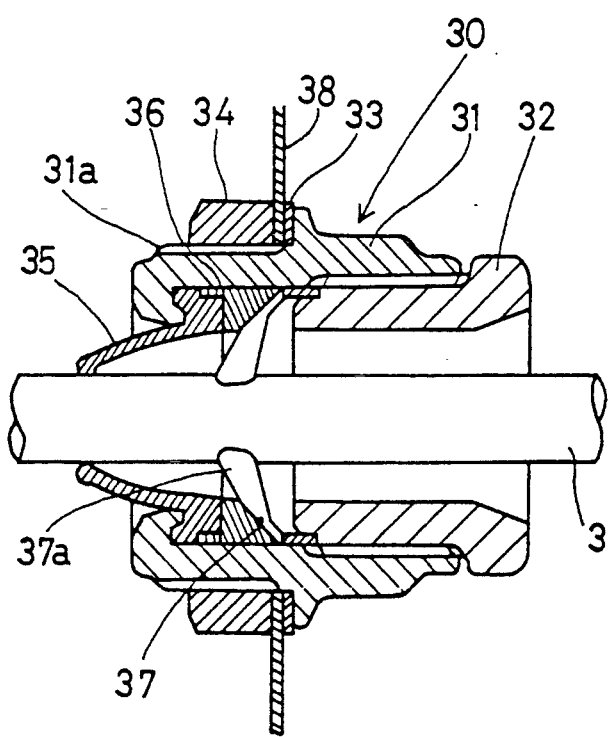
FIG. 4 shows a cross-sectional front view of the third embodiment when a wire is inserted.

FIGS. 3 and 4 show a noise absorber 30 of the third embodiment.

The object of using a noise absorber 30 is to prevent the covering of the wire from being damaged when the wire penetrates through a board, and to fix strongly the wire to the board. A water-proof packing inserted into the inner portion of the housing is also used for a switchbox and other equipment, and the noise absorber 30 is used to prevent moisture from coming into the through hole for the wire.

The noise absorber 30 comprises a male screw thread 31a and a flange 31b formed on the outer peripheral surface of the outer housing 31, molded of magnetic resin, and a female screw thread 31c formed on the inner peripheral surface of the outer housing 31. The female screw thread 31c engages the male screw thread 32b of an inner housing 32 molded of magnetic resin and having an inner hole 32a. A plane packing 33 and a nut 34, which are molded of magnetic resin, are attached to the male screw thread 31a of the outer housing 31. A packing 35, molded of a resilient material such as a synthetic rubber, has an inner hole 35a and its top edge projects from the left edge of the outer housing 31. An outside portion of a guiding ring 36, having a guiding hole, is inserted into the housing 31. A binding ring 37 has a plurality of deformable claws 37a inclined inwardly on the periphery of the inner housing 32, and is inserted into the outer housing 31 to be attached to the guiding ring 36. Reference numeral 38 is an attaching board.

In the above mentioned structure, the wire 3 is completely surrounded by the outside housing 31, the inside housing 32, and the nut 34 molded of magnetic resin, so that any noise generated within the wire 3 is absorbed by the noise absorber 30. However, either one could be molded of magnetic resin to achieve the same effect.

Figure 5:
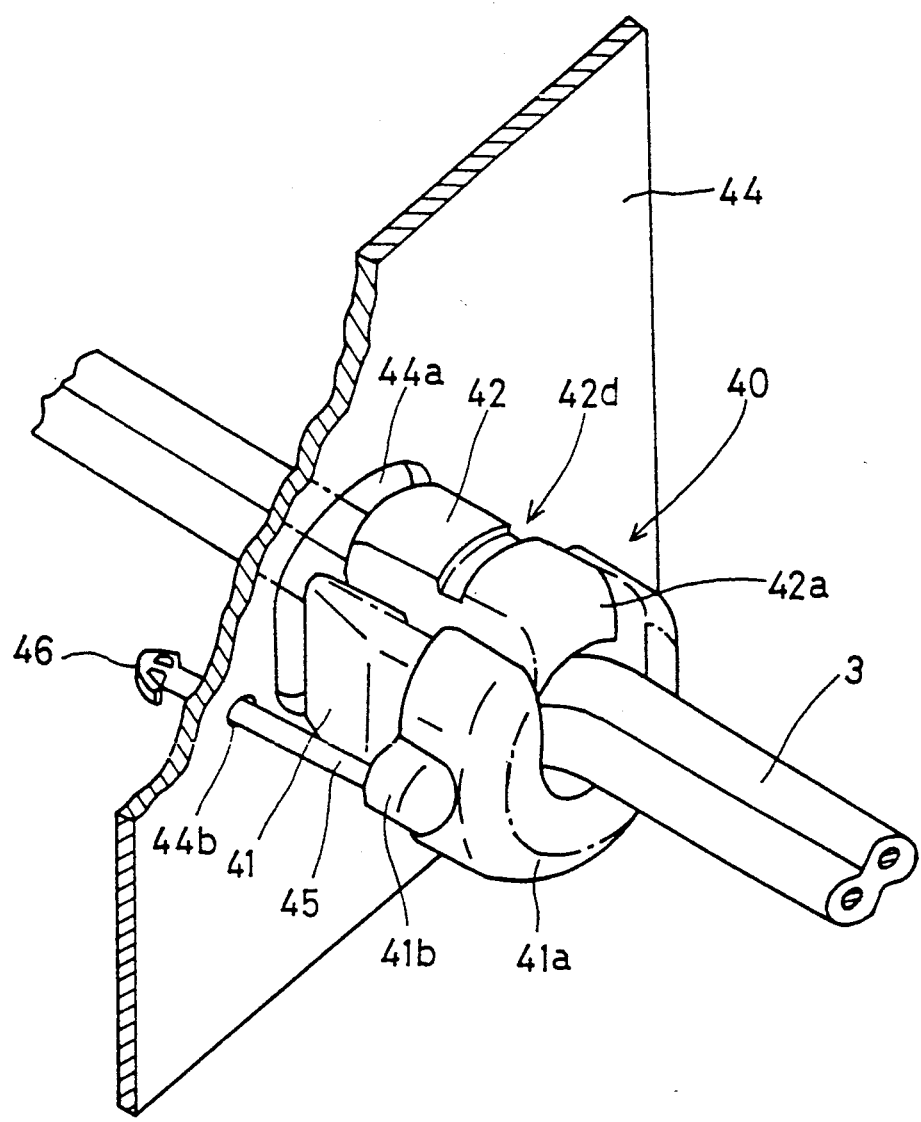
FIG. 5 shows a perspective view of the noise absorber of the fourth embodiment attached to the board.
Figure 6:
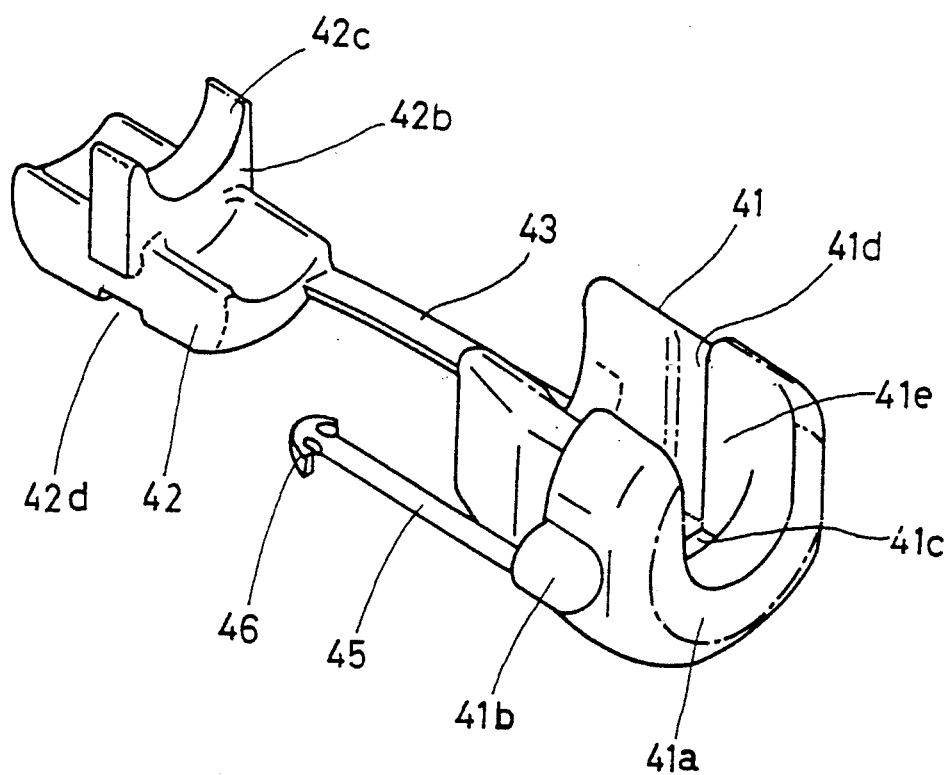
FIG. 6 shows an exploded view in perspective of the fourth embodiment.

FIGS. 5 and 6 show a noise absorber 40 of the fourth embodiment. The noise absorber 40 comprises a body 41, molded of magnetic resin, having a u-shaped cavity 41e, and a mating fitting 42, molded of magnetic resin, for holding the wire 3 inserted into the cavity 41e. The body 41 and the fitting 42 are integrally connected by a band 43. The fitting is assembled onto the wire inserted into the channel by snapping together the fitting and the body with the wire sandwiched therebetween, and is then fixed to the board 44 through the attaching hole 44a. A part of the body 41 and the fitting 42 form flanges 41a and 42a, respectively. Further, a disconnection preventing member 45 extends from a part of the flange 41a of the body 41 as shown in the drawing. The flange 41a forms a protrusion 41b supporting the disconnection preventing member 45. At the remote end of the disconnection preventing member 45, a sagittate and resilient nonreturn element 46 is formed. When inserted through the attaching hole 44b of the board 44, the nonreturn element 46 becomes smaller by resiliency so as to easily pass through the attaching hole 44b. Once the nonreturn element 46 passes through the attaching hole 44b, it returns to its original shape by resiliency, so that the disconnection preventing member 45 does not disconnect from the attaching hole 44b.

Subsequently, the method for fixing the wire 3 to a noise absorber will be explained.

At the bottom portion 41c of the U-shaped cavity 41e, a step is formed corresponding to a wire presser 42b projected from the inside of the fitting 42. The wire 3 is inserted into the U-shaped cavity 41e of the body 41, and the wire presser 42b is assembled into the guiding channel 41d so as to push the fitting downward into the cavity. The wire 3 is bent and pushed to the bottom portion 41c of the U-shaped cavity 41e by the top edge 42c of the wire presser 42b.

In this condition, when the noise absorber 40 is fixed through the attaching hole 44a of the board 44, an indentation 42d formed on the upper surface of the fitting 42 and an indentation (not-shown) which is substantially the same configuration as the indentation 42d formed on the lower surface of the body 41 fit the inner periphery side of the attaching hole 44a corresponding to the resiliency of the wire 3. Thus, the noise absorber 40 is fixed to the board 44. The wire 3 is completely surrounded by the body 41 and the fitting 42 molded of magnetic resin and then the body 41 and the fitting 42 intimately engage each other, so that magnetic flux is not excluded. Therefore, the noise absorber 40 can absorb any noise.

I claim:

1. A noise absorber, for surrounding an electrical wire to absorb electrical noise generated by the electrical wire, comprising:

a body consisting of first and second mating members constructed of a magnetic resin material, each member being integral with means for maintaining said members in mating engagement with one another, each member have a semicircular channel formed therein, whereby when said first and second members are in mating engagement with one another, the semicircular channels form a through hole for accommodating the electrical wire, said magnetic resin material providing said noise absorption without the presence of ferrite pieces disposed within the body.

2. A noise absorber according to claim 1, wherein each of the first and second members has two abutment surfaces, one located on each side of the semicircular channel, and the two abutment surfaces of each member lie in a plane.

3. A noise absorber for surrounding an electrical wire to absorb electrical noise generated by the electrical wire, comprising:

a body consisting of first and second mating members constructed of a magnetic resin material, each member being integral with means for maintaining said members in mating engagement with one another, each member have a semicircular channel formed therein, whereby when said first and second members are in mating engagement with one another, the semicircular channels form a through hole for accommodating the electrical wire, said magnetic resin material providing said noise absorption without the presence of ferrite pieces disposed within the body wherein said first and second members are rectangular elements and two opposed side edges parallel with the axis of the channels of each of the first and second members are each provided with at least one projection and at least one engaging portion.

4. A noise absorber according to claim 3, wherein the projections and the engaging portions on the two opposed side edges of each member are positioned diagonally with respect to one another.

5. A noise absorber according to claim 3, wherein each of the first and second members has two abutment surfaces, one located on each side of the semicircular channel, and the two abutment surfaces of each member lie in a plane.

6. A noise absorber according to claim 1, wherein the magnetic resin material comprises a mixture of iron oxide and a powdered resin.

* * * * *